US006669415B2

(12) United States Patent
Stadtfeld et al.

(10) Patent No.: US 6,669,415 B2
(45) Date of Patent: Dec. 30, 2003

(54) MACHINE FOR PRODUCING BEVEL GEARS (75) Inventors: Hermann J. Stadtfeld, Manderscheid (DE); Craig R. Ronald, Fairport, NY (US)

(73) Assignee: The Gleason Works, Rochester, NY (US)

( * ) Notice: Subject to any disclaimer, the term of this patent is extended or adjusted under 35 U.S.C. 154(b) by 0 days.

(21) Appl. No.: 10/075,891

(22) Filed: Feb. 14, 2002

(65) Prior Publication Data

US 2003/0040258 A1 Feb. 27, 2003

Related U.S. Application Data (60) Provisional application No. 60/269,328, filed on Feb. 16, 2001.

(51) Int. Cl.$^7$ ................................................. B23C 3/00

(52) U.S. Cl. ............................................ 409/27; 409/26

(58) Field of Search ........................ 409/6, 7, 31, 10, 409/25, 26, 27–30, 38, 39, 41, 43, 50–53

(56) References Cited

U.S. PATENT DOCUMENTS

| | | | | |
|---|---|---|---|---|
| 1,373,957 | A | | 4/1921 | Farnum |
| 4,484,387 | A | * | 11/1984 | Nachmany .................. 483/68 |
| 4,981,402 | A | | 1/1991 | Krenzer et al. |
| 5,139,005 | A | * | 8/1992 | Dodd ...................... 125/11.01 |
| 5,961,260 | A | | 10/1999 | Kasler et al. |
| 6,120,355 | A | * | 9/2000 | Stadtfeld et al. .............. 451/47 |
| 6,390,894 | B1 | * | 5/2002 | Beel et al. .................... 409/27 |

FOREIGN PATENT DOCUMENTS

| | | |
|---|---|---|
| DE | 3643967 | 7/1987 |
| DE | 255296 | 3/1988 |
| JP | 5682149 | 7/1981 |
| RU | 724287 | 3/1980 |

OTHER PUBLICATIONS

Copending Patent Application Serial No. 10/078,999 filed Feb. 19, 2002.
Patent Abstracts of Japan, Publication No. 56–82149 published Jul. 4, 1981.
Goldrich, Robert N., "Theory of 6–Axis CNC Generation of Spiral Bevel and Hypoid Gears" AGMA Technical Paper, 89 FTM 9, 1989.
Segal, M.G., "Ways of Numerical Program Control Utilization In Machine Tools For Machining Round Teeth of Conical and Hypoid Transmissions" Izvestiya vuzov., Mashinostroenie, No. 6, 1985, pp. 120–124.
Segal, M.G., *Characteristics of the Components of Machine Tools With Numerical Program Control (NPC) for Machining Teeth on Conical and Hypoid Transmissions*, "Study of the Precision and Productivity of . . . " Mezhduzovskii Scientific Symposium, Saratov Polytechnical Institute, Saratov, Russia, 1995, pp. 19–23.
Sheiko, L.I. et al., *Structure of the Coordinate Combinations of Tooth–Machining Machine Tools for Conical Gears*, Mezhduzovskii Scientific Symposium, "Study of the Precision and Productivity of Tooth Machining Tools and Tools," Saratov Polytechnical Institute, Saratov, Russia, 1995, pp. 60–65.

* cited by examiner

Primary Examiner—A. L. Wellington
Assistant Examiner—Dana Ross
(74) Attorney, Agent, or Firm—Robert L. McDowell (57) ABSTRACT A machine for manufacturing bevel and hypoid gears including a column, a first spindle, and a second spindle is provided. The column has a first side and a second side. The first spindle is movably secured to the first side and rotatable about a first axis. The second spindle is movably secured to the second side and rotatable about a second axis. The first and second spindles are movable linearly with respect to one another in three directions. At least one of the first and second spindles is angularly movable relative to its respective side about a vertical pivot axis.

5 Claims, 11 Drawing Sheets

MACHINE FOR PRODUCING BEVEL GEARS

This application claims the benefit of U.S. Provisional Application No. 60/269,328 filed Feb. 16, 2001.

FIELD OF THE INVENTION

The present invention is directed to gear manufacturing machines and more particularly to machines for cutting and grinding bevel gears.

BACKGROUND OF THE INVENTION

In the production of gears, especially bevel gears, two types of processes are commonly employed, generating processes and non-generating processes.

Generating processes can be divided into two categories, face milling (intermittent indexing) and face hobbing (continuous indexing). In generating face milling processes, a rotating tool is fed into the workpiece to a predetermined depth. Once this depth is reached, the tool and workpiece are then rolled together in a predetermined relative rolling motion, known as the generating roll, as though the workpiece were rotating in mesh with a theoretical generating gear, the teeth of the theoretical generating gear being represented by the stock removing surfaces of the tool. The profile shape of the tooth is formed by relative motion of the tool and workpiece during the generating roll.

In generating face hobbing processes, the tool and workpiece rotate in a timed relationship and the tool is fed to depth thereby forming all tooth slots in a single plunge of the tool. After full depth is reached, the generating roll is commenced.

Non-generating processes, either intermittent indexing or continuous indexing, are those in which the profile shape of a tooth on a workpiece is produced directly from the profile shape on the tool. The tool is fed into the workpiece and the profile shape on the tool is imparted to the workpiece. While no generating roll is employed, the concept of a theoretical generating gear in the form of a theoretical "crown gear" is applicable in non-generating processes. The crown gear is that theoretical gear whose tooth surfaces are complementary with the tooth surfaces of the workpiece in non-generating processes. Therefore, the cutting blades on the tool represent the teeth of the theoretical crown gear when forming the tooth surfaces on the non-generated workpiece.

Conventional mechanical gear generating machines for producing bevel gears comprise a work support mechanism and a cradle mechanism. During a generating process, the cradle carries a circular tool along a circular path about an axis known as the cradle axis. The cradle represents the body of the theoretical generating gear and the cradle axis corresponds to the axis of the theoretical generating gear. The tool represents one or more teeth on the generating gear. The work support orients a workpiece relative to the cradle and rotates it at a specified ratio to the cradle rotation. Traditionally, conventional mechanical cradle-style bevel gear generating machines are usually equipped with a series of linear and angular scales (i.e. settings) which assist the operator in accurately locating the various machine components in their proper positions.

It is common in many types of conventional mechanical cradle-style bevel gear generating machines to include an adjustable mechanism which enables tilting of the cutter spindle, and hence, the cutting tool axis, relative to the axis of the cradle (i.e. the cutter axis is not parallel to the cradle axis). Known as "cutter tilt," the adjustment is usually utilized in order to match the cutting tool pressure angle to the pressure angle of the workpiece, and/or to position the cutting surfaces of the tool to appropriately represent the tooth surfaces of the theoretical generating gear. In some types of conventional mechanical cradle-style bevel gear generating machines without a cutter tilt mechanism, the effects of cutter tilt may be achieved by an altering of the relative rolling relationship between the cradle and workpiece. This altering is also known as "modified roll."

In the recent past, gear producing machines have been developed which reduce the number of machine settings necessary to orient a tool relative to a workpiece. These machines replace some or all of the settings and movements of the conventional mechanical cradle-style machine with a system of linear, rotational, and/or pivoting axes.

SUMMARY OF THE INVENTION

The present invention is generally directed to a machine for manufacturing bevel and hypoid gears including a column, a first spindle, and a second spindle. The column includes substantially vertical side walls including first and second areas. The first spindle is movably secured to the column at the first area and is rotatable about a first axis. The second spindle is movably secured to the column at the second area and is rotatable about a second axis. The first and second spindles are movable linearly with respect to one another in three directions. At least one of the first and second spindles is angularly movable relative to its respective area about a substantially vertical pivot axis.

In a preferred aspect, the present invention is directed to a machine for manufacturing bevel and hypoid gears including a column, a slide, a workpiece spindle, and a tool spindle. Vertical ways are located between a first vertical surface area of the column and the slide to allow movement of the slide along a first linear direction. First horizontal ways are located between the slide and the workpiece spindle to allow movement of the workpiece spindle along a second linear direction. Second horizontal ways are located between a second vertical surface area of the column and the tool spindle to allow movement of the tool spindle along a third linear direction. A pivot is connected to the tool spindle to allow movement of the tool spindle around a vertical pivot axis.

DETAILED DESCRIPTION OF THE PREFERRED EMBODIMENT

The details of the present invention will now be discussed with reference to the accompanying drawings which illustrate the present invention by way of example only. In the drawings, similar features or components will be referred to by like reference numbers.

In the context of the present invention, the term "bevel" gears is understood to be of sufficient scope to include those types of gears known as bevel gears, "hypoid" gears, as well as those gears known as "crown" or "face" gears.

A first embodiment of the inventive machine for manufacturing bevel gears is illustrated in FIGS. 1–5 and designated generally by 2. For ease in viewing the various machine components, FIGS. 1–5 illustrate the inventive machine without doors and exterior sheet metal. The machine 2 comprises a single stationary column 4 of the type disclosed in U.S. Pat. No. 6,120,355, the disclosure of which is hereby incorporated by reference. Column 4 comprises at least two sides, preferably four sides, with at least two of the sides, first side 6 and second side 8, being oriented at a desired angle, preferably perpendicular, to one another. Each of the first and second sides comprises a width and a height (as viewed in FIG. 1).

Figure 1:
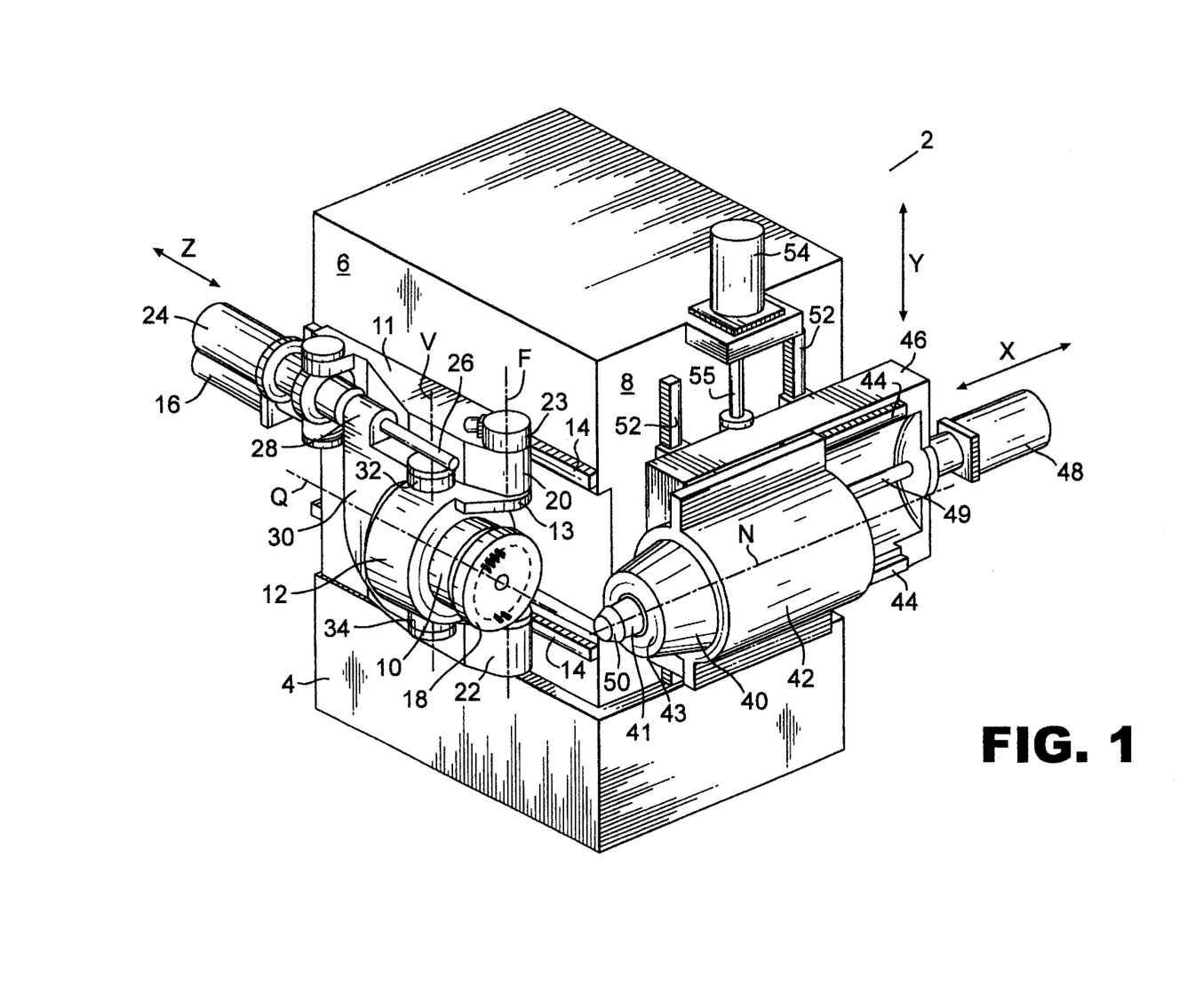
FIG. 1 is an isometric view of a first embodiment of the inventive gear manufacturing machine with the tool and workpiece disengaged.

First side 6 includes first spindle 10 having a front or seating surface 15. Spindle 10 is rotatable about axis Q and is preferably driven by a direct drive motor 12, preferably liquid-cooled, and preferably mounted behind front and rear spindle bearings (not shown). Spindle 10 is pivotably secured to a spindle support 11 which, along with spindle 10, is movable in direction Z along the width of first side 6 on ways 14 attached to column 4. Movement of spindle 10 in direction Z is provided by motor 16 through a direct-coupled ballscrew (not shown) or by direct drive. Preferably, a cutting or grinding tool 18 (cutting tool is shown) is releasably mounted to spindle 10 by suitable mounting equipment as is known in the art.

As stated above, first spindle 10 is attached to spindle support 11 such that pivoting of the spindle, and hence the tool 18, may occur about pivot axis F. Spindle bracket 13 is pivotally attached to support 11 via at least one, and preferably two, bearing connections 20 and 22, upper bearing connection 20 and lower bearing connection 22. Pivoting of spindle 10 is effected by motor 24 and direct-coupled ballscrew 26, or by direct drive, acting through sleeve portion 28 of yolk 30. Yolk 30 is pivotally attached to spindle 10 preferably at an upper connection 32 and a lower connection 34 such that yolk 30 may angularly move relative to spindle 10 about axis V. Advancing of ballscrew 26, and hence yolk 30, effectively pushes drive motor 12 angularly away from column 4 thereby causing a pivot motion about axis F to angularly move the tool 18 toward the machine column 4. See FIG. 3 for cutting a pinion and FIG. 5 for cutting a ring gear. Of course, retracting ballscrew 26 has the opposite effect.

Second side 8 includes second spindle 40 which is rotatable about axis N and is preferably driven by a direct drive motor 42, preferably liquid-cooled, and preferably mounted behind front and rear spindle bearings (not shown). Spindle 40 is movable in direction X along the width of second side 8 on ways 44 attached to slide 46. Movement of spindle 40 in direction X is provided by motor 48 through a direct-coupled ballscrew 49 or by direct drive. Preferably, a workpiece (a pinion 50 in FIG. 1 and a ring gear 51 in FIG. 4) is releasably mounted to spindle 40 by suitable workholding equipment 41 as is known in the art. Spindle 40 is also movable in direction Y along the height of second side 8 since slide 46 is movable in the Y direction via ways 52 with movement being provided by motor 54 through a direct-coupled ballscrew 55 or by direct drive. Directions X, Y and Z are preferably mutually perpendicular with respect to one another although one or more may be inclined with respect to its perpendicular orientation. For purposes of illustration, in all Figures, the Y direction is vertical.

Movement of first spindle 10 in direction Z, second spindle 40 in direction X, second spindle 40 via slide 46 in direction Y, pivoting of first spindle 10 about axis F, as well as first spindle 10 rotation and second spindle 40 rotation, is imparted by the separate drive motors 16, 48, 54, 24, 12 and 42 respectively. The above-named components are capable of independent movement with respect to one another or may move simultaneously with one another. Each of the respective motors is preferably associated with a feedback device such as a linear or rotary encoder, such as pivot axis encoder 23 (FIG. 1), as part of a CNC system which governs the operation of the drive motors in accordance with instructions input to a computer controller (i.e. CNC) such as the Fanuc model 160i or Siemens model 840D (not shown).

The machine of the present invention as illustrated by the embodiments is guided by the controller which preferably continuously issues positioning and/or velocity commands to the various drive motors. Rather than load a large number of axis-positioning commands into the controller, it may be more efficient and meaningful to input a smaller set of data describing the gear manufacturing process. A logical candidate for such data is a set of "basic machine settings." Using this approach, a machine operator would enter a set of basic machine settings (discussed in detail below) into the controller, which, in turn, would calculate the axis positions corresponding to a range of cradle positions. Thus, the basic "language" for describing bevel gear generating motions is retained in the present invention.

The relationship between the theoretical generating gear in mesh with a workpiece is maintained in the present invention by angular movement between the tool and workpiece axes in combination with relative rectilinear movements between the tool and workpiece axes along one or more of the three rectilinear axes and rotational movement of the workpiece about its axis. In the case of continuous indexing, rotational movement of the tool axis is also controlled.

Because of the complexity of tooth surfaces formed by conventional mechanical cradle-style bevel gear generators, such tooth surfaces can only be exactly defined geometrically by the machine motions which are used to produce them. While some general parameters of gear design may be specified (e.g. number of teeth, pitch angle, etc.) the equations which are used to define bevel tooth surfaces are the motion equations of generating machines.

Given the above, it is evident that with each machine configured differently than the conventional mechanical cradle-style bevel gear generator, a new set of formulas and other know-how would be required to determine appropriate machine settings and operating parameters for producing known gear tooth geometry and mating characteristics. However, since the conventional mechanical cradle-style bevel gear generating machine has been in existence for many years, a large amount of know-how already exists which relates desired tooth geometry and mating characteristics to conventional cradle-style machine settings.

Therefore, although a new set of formulas may be developed for a newly configured machine, it has generally become the practice in the art to utilize the same input parameters as a conventional mechanical cradle-style gear generating machine for other machines having a different number and/or configuration of axes. In other words, the positions of the tool and workpiece axes in the coordinate system of a conventional mechanical cradle-style bevel gear generating machine are transformed into the alternative coordinate system of the newly configured machine. An example of such a transformation can be found in U.S. Pat. No. 4,981,402 the disclosure of which is hereby incorporated by reference. The relationship between the invention and the conventional mechanical cradle-style bevel gear generator will be discussed below.

Figure 6:
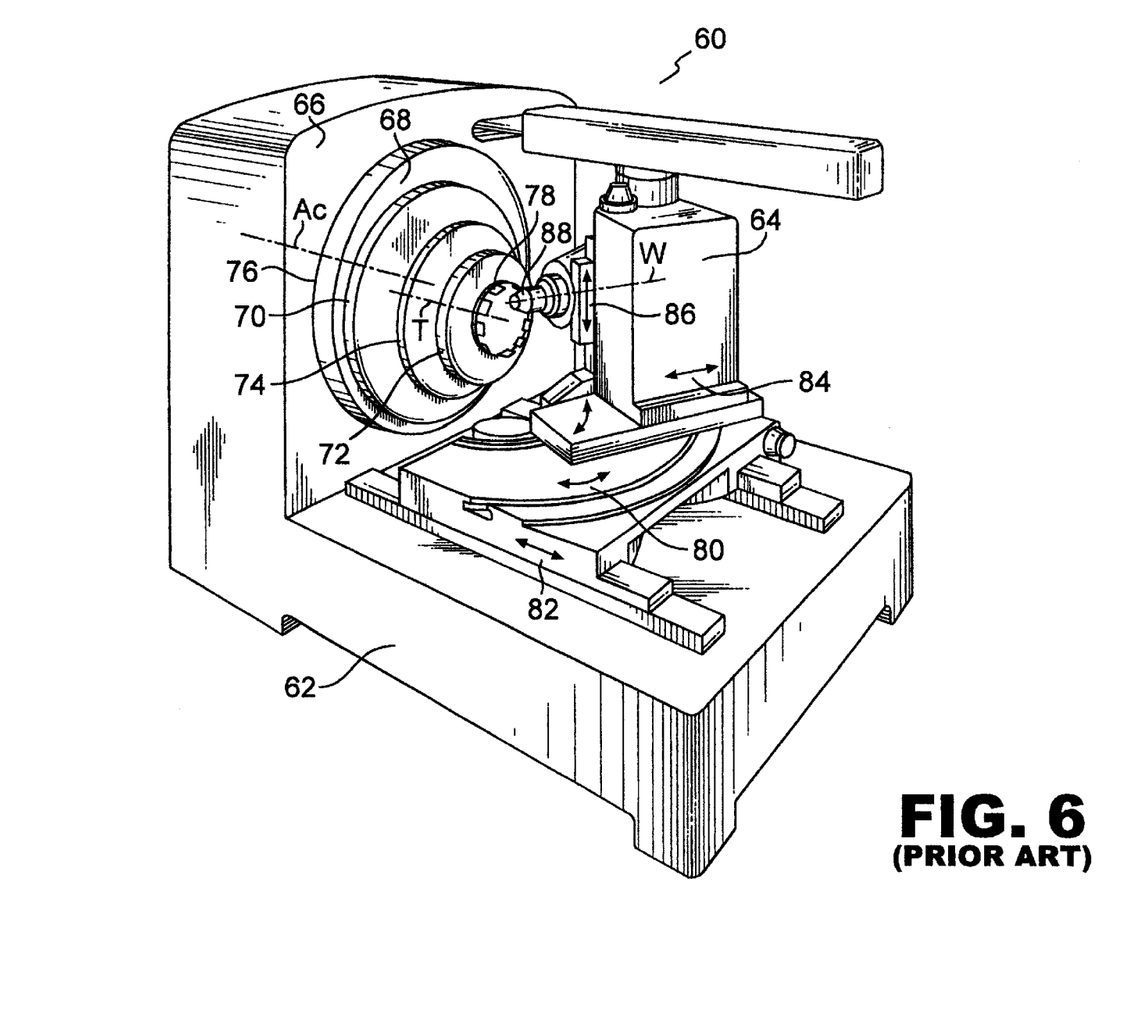
FIG. 6 illustrates a conventional mechanical cradle-style bevel gear generating machine with cutter tilt.

A conventional mechanical cradle-style bevel gear generating machine 60 (FIG. 6) for producing bevel gears generally comprises a machine frame 62, work support mechanism 64 and a cradle support 66 comprising a cradle mechanism 68. Traditionally, conventional mechanical cradle-style bevel gear generating machines are usually equipped with a series of linear and angular scales (i.e. settings) which assist the operator in accurately locating the various machine components in their proper positions. The following is a description of settings found on a tilt-equipped conventional mechanical cradle-style bevel gear generating machine such as the machine shown in FIG. 6:

Eccentric Angle 70 controls the distance between the cradle axis, $A_C$, and the tool axis, T, Tool Spindle Rotation Angle 72 controls the angle between the cradle axis and the tool axis, commonly called the tilt angle, Swivel Angle 74 controls the orientation of the tool axis relative to a fixed reference on the cradle 88, Cradle Angle 76 positions the tool 78 at some angular position about the cradle axis, Root Angle 80 orients the work support 64 relative to the cradle axis, Sliding Base 82 is a linear dimension which regulates the depth of tool engagement with the workpiece, Head Setting 84 is a linear adjustment of the work support 64 along the workpiece axis, W, and, Work Offset 86 controls the offset of the workpiece axis relative to the cradle axis.

A final setting, ratio-of-roll, governs the relative rotational motion between the cradle 68 and workpiece 88. It should be noted that some of the above machine settings must be calculated taking into account the following workpiece and tooling design specifications:

the mounting distance of the blank workpiece (symbol—$M_d$), the overall length of the work holding equipment (symbol—$A_b$), and, the overall height of the tool (symbol—h).

Although the measures of these settings allow precise positioning of the machine components, the measures themselves convey little information about their location relative to one another. For instance, a head setting of 5 inches will position the work support in a different physical location relative to the cradle depending on the model of machine considered. This situation results from the "zero" head-setting position being defined differently on different model machines. In a similar manner, a setting of 30 degrees on the eccentric angle communicates little regarding the distance between the tool and the cradle axis since it is an angular measure which actually controls a linear dimension. Additional details must be furnished before the more meaningful linear distance can be calculated.

More immediately significant to the artisan is a set of absolute measures of machine component positioning, that is, measures which are independent of the tooling or machine model considered. These general, or basic machine settings, immediately communicate a sense of size and proportion regarding the generating gear and the workpiece being generated. They also provide a common starting point for gear design. For example, gear sets may be designed in terms of basic settings, thus unifying design procedures among many models of machines. In addition, analysis procedures need be written only once to cover all machine configurations if basic settings are employed. Of course, conversion to true machine-dependent settings is required to set-up a conventional mechanical cradle-style bevel gear generator but this is best performed just before presentation as a machine set-up summary.

Figure 7:
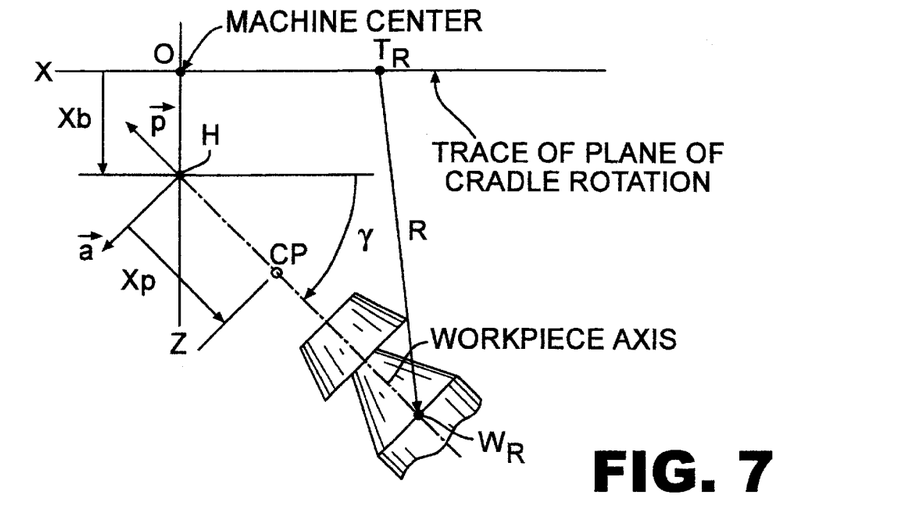
FIG. 7 is a schematic top view of a conventional mechanical cradle-style bevel gear generator.
Figure 8:
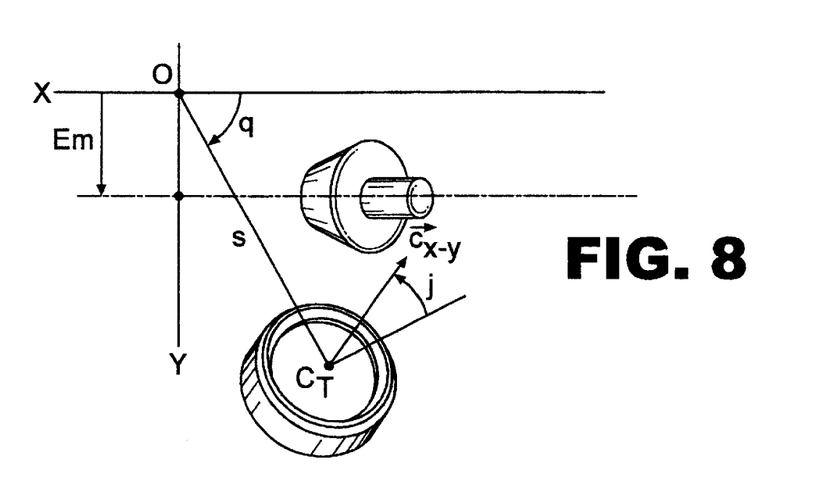
FIG. 8 is a schematic front view of a conventional mechanical cradle-style bevel gear generator.
Figure 9:
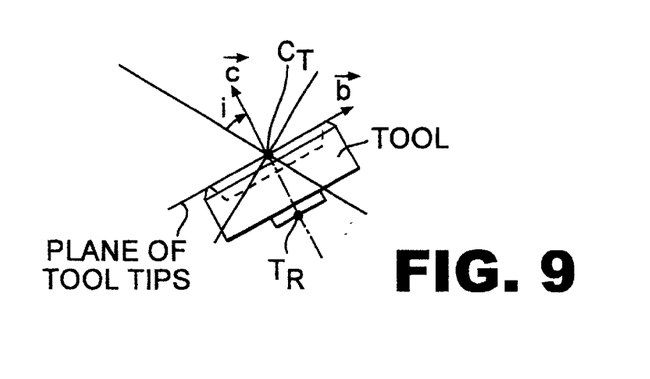
FIG. 9 is a side view of the tool in FIG. 8.

A description of basic machine settings appears below and with reference to FIGS. 7–9. FIGS. 7 and 8 show, respectively, top and front views of a conventional mechanical cradle-style bevel gear generator with tilt. FIG. 9 is a projection showing a side view of the tool in true length. Details unrelated to the present discussion have been omitted for clarity.

Initially, two reference points are defined. The first point, point $C_T$, is on the tool axis at some known position relative to the tool. This point, called the Tool Center, is usually chosen to lie in the plane defined by the tips of the tool (FIG. 9). The second reference point, CP, lies on the workpiece axis at the crossing point, that is, the point of intersection of the workpiece axis and the axis of its mating member. In the case of hypoid gears, CP lies at the point of apparent intersection between mating members when viewed in a plane parallel to both axes. Another point of interest, point O, is known as the machine center. This point is defined by the intersection of the cradle axis and the plane of cradle rotation (FIG. 7).

Using the above points, the following basic settings may be defined:

Radial, s, (FIG. 8)—the distance from machine center O to tool center $C_T$ when viewed in the plane of cradle rotation.

Cradle Angle, q, (FIG. 8)—the angle formed by radial $OC_T$ and a plane parallel to both the workpiece and cradle axes.

Tilt Angle, i, (FIG. 9)—the angle formed by the tool axis and cradle axis. Usually taken to be between 0 and 90 degrees.

Swivel Angle, j, (FIG. 8)—determines the direction of tool axis tilt. It is measured from line $C_TA$ which is rigidly connected and perpendicular to radial line $OC_T$. Its measure is the angle formed by line $C_T A$ and the projection of the tool axis on the plane of cradle rotation.

Work Offset, $E_m$, (FIG. 8)—the minimum distance between the cradle axis and workpiece axis.

Sliding Base, $X_b$, (FIG. 7)—the distance between machine center O and point H, the point of apparent intersection of workpiece and cradle axes. This appears true length when viewed in a plane parallel to both cradle and workpiece axes.

Head setting, $X_p$, (FIG. 7)—the distance between apparent point H (identified above) and crossing point CP. Measured along the workpiece axis.

Root Angle, γ, (FIG. 7)—the angle formed by the workpiece axis and the plane of cradle rotation.

Note: All parameters appear true length in the noted Figures, and positive in the sense shown.

The generation process is mainly governed by the ratio-of-roll (ratio of workpiece rotation to cradle rotation). Additional motion parameters (e.g. helical motion) may also be defined to augment the rolling motion between the cradle and workpiece. It is noted that other arrangements of basic machine settings could have been chosen instead of the one described. However, this particular choice of settings retains a likeness with conventional mechanical cradle-style bevel gear generating machine configurations, and clarifies essential geometric properties where appropriate.

Besides the eight settings defined above, it is useful to measure the rotational position of the workpiece about its own axis from some reference. Also, in the case of face hobbing, the rotary position of the tool about its own axis may be of interest. Combined together, these ten parameters totally describe the relative positioning between tool and workpiece at any instant. Three of them (cradle angle, workpiece rotation, tool rotation) change in the process of generation, while the other seven are "true" settings, i.e. they usually remain fixed.

Figure 10:
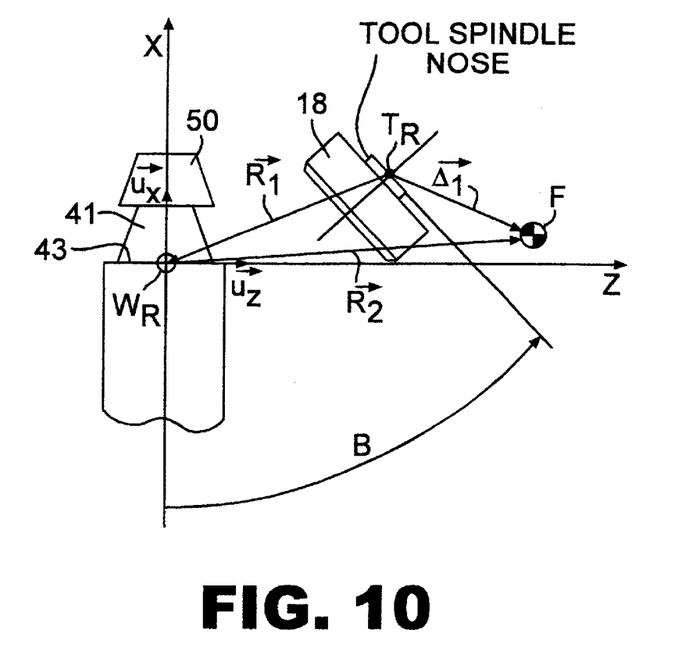
FIG. 10 is a schematic top view of the cutting tool and workpiece of the first embodiment of the present invention.
Figure 11:
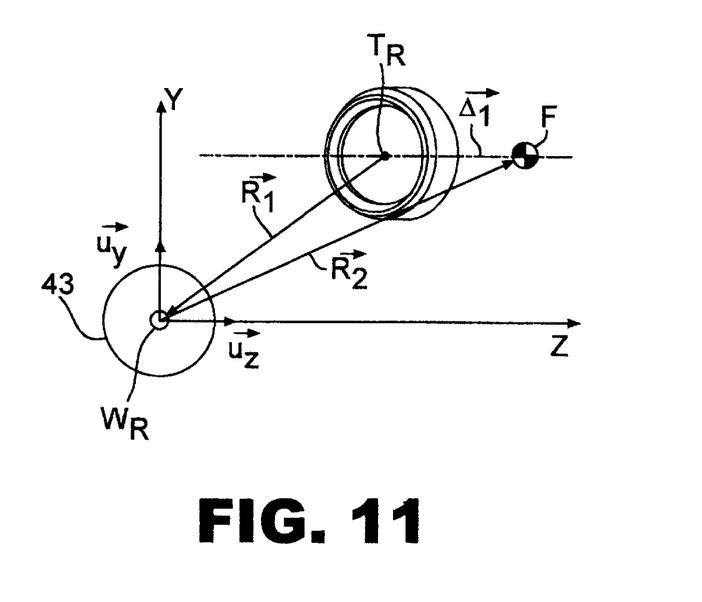
FIG. 11 is a view along the cutting tool axis of FIG. 10.

A mathematical model is developed which accepts the basic machine settings, identified above, and exactly replicates bevel gear generation on the inventive embodiments through displacements along or about its six axes. FIGS. 10 and 11 show, respectively, partial front and top views of the inventive tool and workpiece arrangement in the coordinate system of the first embodiment of the present invention. Referring to FIGS. 7–9, which illustrate the tool and workpiece arrangement of a conventional mechanical cradle-style bevel gear generating machine in the coordinate system of that conventional machine, vectors are defined along the workpiece and tool axes:

$$\vec{p} = \{-\cos \gamma, 0, -\sin \gamma\}$$

workpiece axis $$\vec{c} = \{\sin i \sin(q-j), \sin i \cos(q-j), \cos i\}$$

tool axis

Next, the "key-way" vectors, perpendicular and attached to the workpiece and tool axes, are defined:

$$\vec{a} = \{-\sin \gamma, 0, \cos \gamma\}$$

workpiece key-way vector $$\vec{b} = \{\cos(q-j), -\sin(q-j), 0\}$$

tool key-way vector

Finally, a vector R is defined from the tool seat $T_R$ (the back of the tool) to the point $W_R$ on the workpiece axis which lies directly in the seating surface plane of the work arbor:

$$\vec{R} = \{-s \cos q, s \sin q - E_m, X_b\} - (X_p + M_d + A_b)\vec{p} + h\vec{c}$$

Motions of the machine embodiment of FIGS. 1–5 may now be determined. A new coordinate system is associated with the axes arrangement of the orthogonal machine of FIGS. 1–5 with the origin being at point $W_R$ on the seating surface or nose 43 of the machine spindle 40 Orthogonal axes are given by:

$$\vec{u}_X = \vec{p}$$

workpiece axis, lines up with X axis $$\vec{u}_Y = -\frac{\vec{p} \times \vec{c}}{|\vec{p} \times \vec{c}|} \quad \text{vertical, pointing up, lines up with Y axis}$$

$$\vec{u}_Z = \vec{u}_X \times \vec{u}_Y$$

horizontal and perpendicular to $u_X$, lines up with Z axis

Since pivot axis, F, as shown in FIGS. 1–5 is not located on the workpiece axis, as is customary, but instead is preferably positioned in the vicinity of the tool as shown by vector $\Delta_1$ in FIG. 10, the position of the pivot axis in the new coordinate system must be defined.

Figure 12:
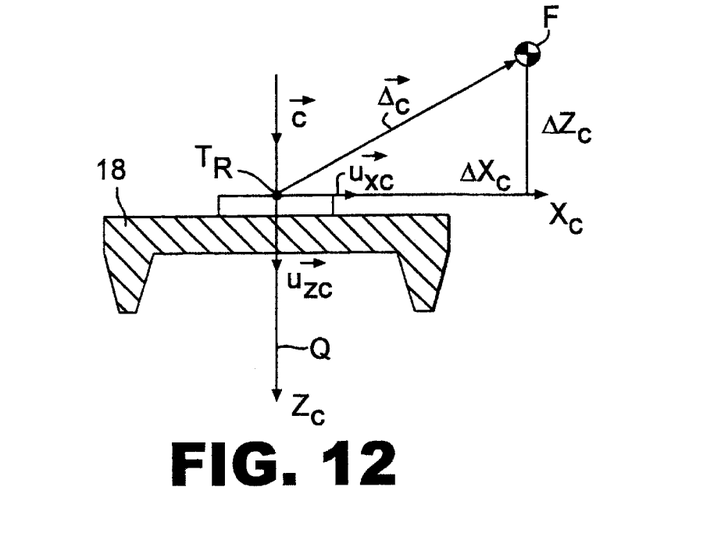
FIG. 12 illustrates pivot axis F referenced in a coordinate system based on the reference plane of the cutting tool in the first embodiment of the present invention.
Figure 13:
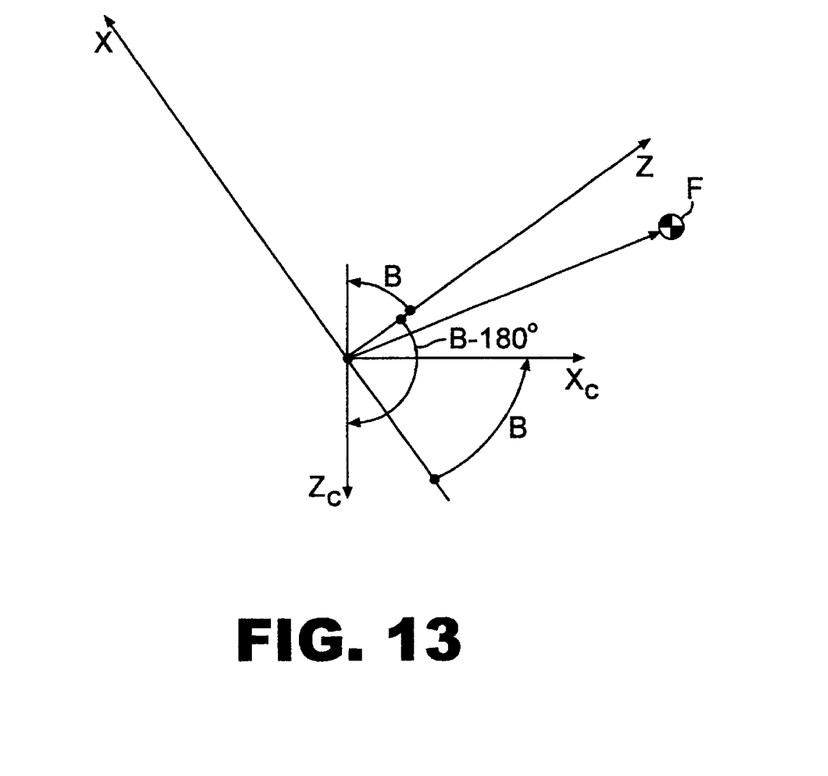
FIG. 13 shows the coordinate system of FIG. 12 and the coordinate system of the first embodiment of the inventive machine.

With reference to FIGS. 12 and 13, pivot axis F is defined in a coordinate system attached to tool 18 in which the axis $Z_C$ is coincident with the axis $\vec{c}$ of the cutting tool and axis $X_C$ is perpendicular to $Z_C$ and extends along the back surface of the tool 18 (FIG. 12). The following can be seen from FIG. 12:

$$\vec{u}_{ZC} = \vec{c}$$

unit vector $u_{ZC}$ in the direction of $Z_C$ $$\vec{u}_{XC} = \vec{u}_y \times \vec{u}_{ZC}$$

unit vector $u_{XC}$ in the direction of $X_C$ $$\vec{\Delta}_C = \{\Delta x_C, 0, \Delta z_C\}$$

As seen in FIG. 13, transformation of $\vec{\Delta}_C$ in the tool coordinate system of FIG. 12 to the new coordinate system of the embodiment shown in FIGS. 1–5 is given by:

$$\vec{\Delta}_1 = (B - 180°)_y \cdot \vec{\Delta}_C \text{ and, therefore,}$$

$$\vec{\Delta}_1 = \begin{pmatrix} \cos(B-180°) & 0 & \sin(B-180°) \\ 0 & 1 & 0 \\ -\sin(B-180°) & 0 & \cos(B-180°) \end{pmatrix} \begin{Bmatrix} \Delta x_C \\ 0 \\ \Delta z_C \end{Bmatrix}$$

$$= \begin{Bmatrix} -\Delta x_C \cos B - \Delta z_C \sin B \\ 0 \\ \Delta x_C \sin B - \Delta z_C \cos B \end{Bmatrix}$$

From the coordinate system of FIGS. 10 and 11, which represents the coordinate system of the embodiment illustrated in FIGS. 1–5, it may be seen that:

$$\vec{R}_1 = \begin{Bmatrix} \vec{R} \cdot \vec{u}_X \\ \vec{R} \cdot \vec{u}_Y \\ \vec{R} \cdot \vec{u}_Z \end{Bmatrix} \text{ and } \vec{R}_2 = \vec{\Delta}_1 - \vec{R}_1$$

wherein:
$R_1$=vector from point $T_R$ on tool to point $W_R$ on the seating surface 43 of machine spindle 40, and,
$R_2$=vector from point $W_R$ on the seating surface 43 of machine spindle 40 to pivot axis F.

Therefore, the displacement along the X, Y, Z rectilinear axes of the machine embodiment of FIGS. 1–5 at a specified increment, such as each increment of generating roll, are calculated:

$$A_X = \vec{R}_{2X}$$

displacement along X axis $$A_Y = \vec{R}_{2Y}$$

displacement along Y axis $$A_Z = \vec{R}_{2Z}$$

displacement along Z axis

The three angular rotations must also be found. The pivot angle, B, at a specified increment, such as each increment of generating roll, is given by:

$$B = \arccos\left(-\vec{p} \cdot \left(\frac{\vec{p} \times \vec{c}}{|\vec{p} \times \vec{c}|} \times \vec{c}\right)\right)$$

The tool and workpiece axes each have an associated rotational phase angle which is superimposed on their motions as defined by conventional mechanical generators. These compensate for the changing relative orientation of conventional and inventive machine horizontal planes at a specified increment, such as each increment of generating roll. They are defined as:

$$\alpha = \arcsin\left(-\vec{a} \cdot \frac{\vec{p} \times \vec{c}}{|\vec{p} \times \vec{c}|}\right) \text{ workpiece axis phase angle}$$

$$\beta = \arcsin\left(-\vec{b} \cdot \left(\frac{\vec{p} \times \vec{c}}{|\vec{p} \times \vec{c}|} \times \vec{c}\right)\right) \text{ tool axis phase angle}$$

An operation is also performed to determine the desired rotational position of the workpiece, ω, in accordance with phase angles alpha and beta and other setup constants including ratio of roll, $R_a$, which specifies the ratio of relative rotation between the imaginary cradle and workpiece required for generation, indexing or hobbing constant, $R_C$, which specifies the ratio of relative rotation between the tool and workpiece for continuous indexing, and reference constant $\omega_o$ which specifies a known rotational position between the tool and workpiece. Other constants (not shown) may be used to further adjust the workpiece axis rotational position for duplicating special motions of conventional mechanical cradle-style machines such as "modified roll." The operation may be expressed as:

$$\omega = \omega_O + f(R_a, \Delta q) + f(R_C, \Delta t) + f(R_C, \text{beta}) + \text{alpha}$$

wherein:

$$\Delta q = q - q_0$$

with q=instantaneous cradle roll orientation
$q_0$=cradle orientation at center of roll $$\Delta t = t - t_0$$

with t=instantaneous tool spindle orientation
$t_0$=initial tool spindle orientation The above equation as written represents one embodiment of the general mathematical relationship wherein workpiece rotation is a function of $R_a$, $R_C$, alpha, beta, q and t. However, other variables such as intermediate variables in the form of basic settings s, i, j, $E_m$, $X_b$, $X_p$, and γ, for example, may also be utilized in describing workpiece rotation resulting from input parameters. The calculation for ω is not limited to the specific expression shown above for this embodiment.

Figure 14:
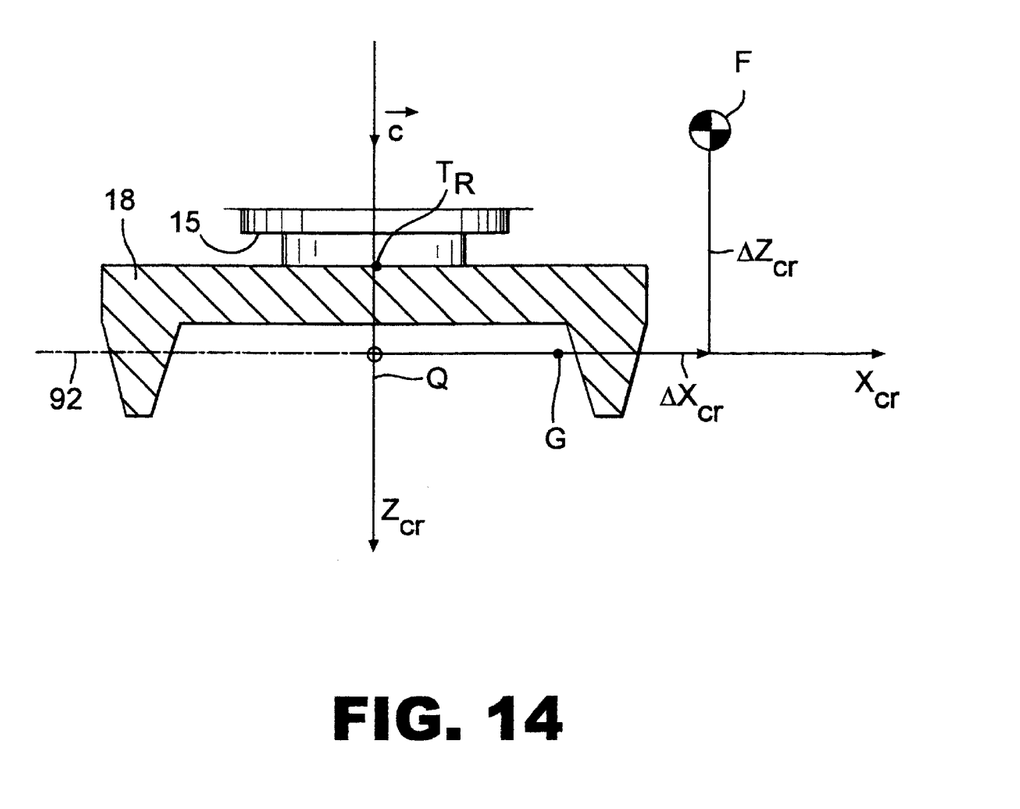
FIG. 14 shows the coordinate systems of the cutting tool, $X_C$-$Z_C$, and the inventive machine, X-Z, in the first embodiment of the present invention.

It has been discovered that the pivot axis F, defined, for instance with respect to cutting tools, within the cutting tool reference plane coordinate system $X_{CR}$-$Z_{CR}$ of FIG. 14, is preferably located in the quadrant of that coordinate system where $X_{CR}$ is positive and $Z_{CR}$ values are negative. Axis $X_{CR}$ lies in the cutter reference plane 92 defined by the mid-point of the height of the blade cutting edges and axis $Z_{CR}$ is coincident with the tool axis $\vec{c}$. Applying this definition to the embodiment of FIG. 1, for example, with axis Q perpendicular with axis N, it can be seen that the pivot axis F should be located on or "behind" the reference plane of the cutting tool 18 and at a point between the axis Q and the machine column 4.

Placement of the pivot axis F should preferably be at a location whereby smooth and minimal motion along the axes is exhibited, such as noted on motion diagrams utilized to analyze machine motions, along with few, if any, reversal or inflection points. Preferably, pivot axis F should be positioned in the quadrant discussed above at a location therein defined by a positive $\Delta X_{CR}$ value being equal to the average radius of the cutting tool(s) to be used on the machine. Preferably, $\Delta Z_{CR}$ is equal to zero. For example, if cutting tools having diameters of 3 inches and 9 inches are contemplated, the average radius of the cutting tools would be 3 inches. Thus, $\Delta X_{CR}$ would be 3 inches, placing it at about point G in FIG. 14 if, for example, cutting tool 18 has a radius of 4.5 inches. Point G is in the vicinity of the gear tooth calculation point (for the average pinion or ring gear) which is located at the center of a tooth. A pivot axis passing through point G would be perpendicular to the $X_{CR}$-$Z_{CR}$ plane.

Also preferred is placement of the pivot axis in a location that allows the pivoting mechanism to be isolated from the workpiece and tool, such that it can be shielded from stray chips. Isolating the pivot axis should preferably still permit minimal and smooth motion along the axes with few, if any, reversal or inflection points as noted on machine motion diagrams as was discussed above. Given this, it has been found that one preferred location for the pivot axis F is at a point $\Delta X_{CR}$ located between the cutting blades of the largest tool contemplated for the machine and the machine column 4, and at a $\Delta Z_{CR}$ generally about equal in magnitude to $\Delta X_{CR}$. More specifically, $\Delta X_{CR}$ is preferably at about the average diameter of the tools contemplated for the machine and $\Delta Z_{CR}$ is preferably generally about equal in magnitude to $\Delta X_{CR}$. For example, if cutting tools of 3 inch diameter and 9 inch diameter are contemplated, the average diameter is 6 inches. Thus, $\Delta X_{CR}$=6 inches, placing it beyond the cutting blades of the largest tool which would be at $\Delta X_{CR}$=4.5 inches for the 9 inch diameter tool. $\Delta Z_{CR}$ would also be generally about 6 inches but may vary plus/minus 2 inches. With placement of the pivot axis as set forth, travel of about 10–30 mm is noted along each of the linear axes which is desirably small and yet of a magnitude such that motion along the axes is accurately controllable by the machine controls.

Figure 2:
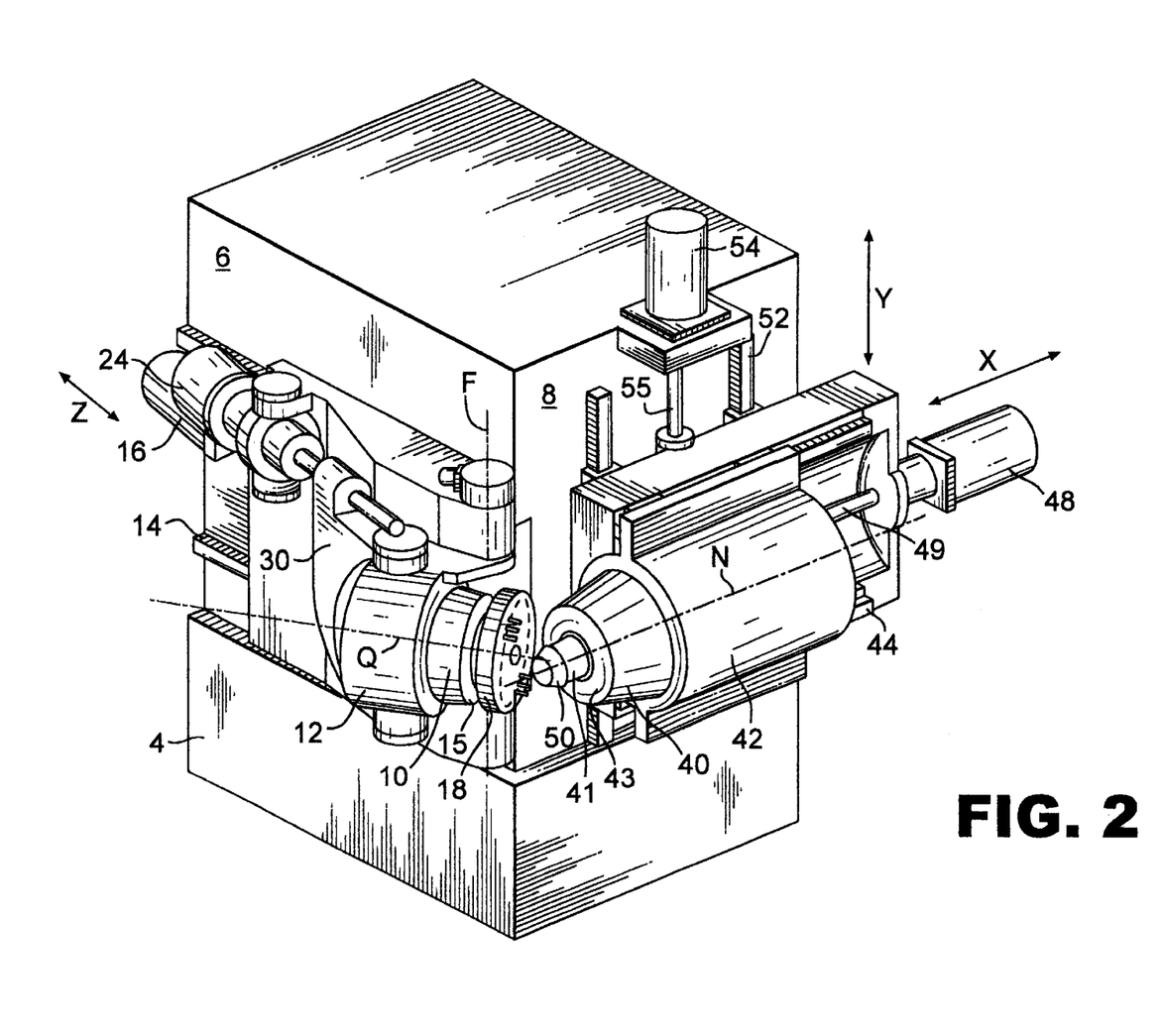
FIG. 2 is an isometric view of the first embodiment of the inventive gear manufacturing machine showing a cutting tool engaged with a pinion.
Figure 3:
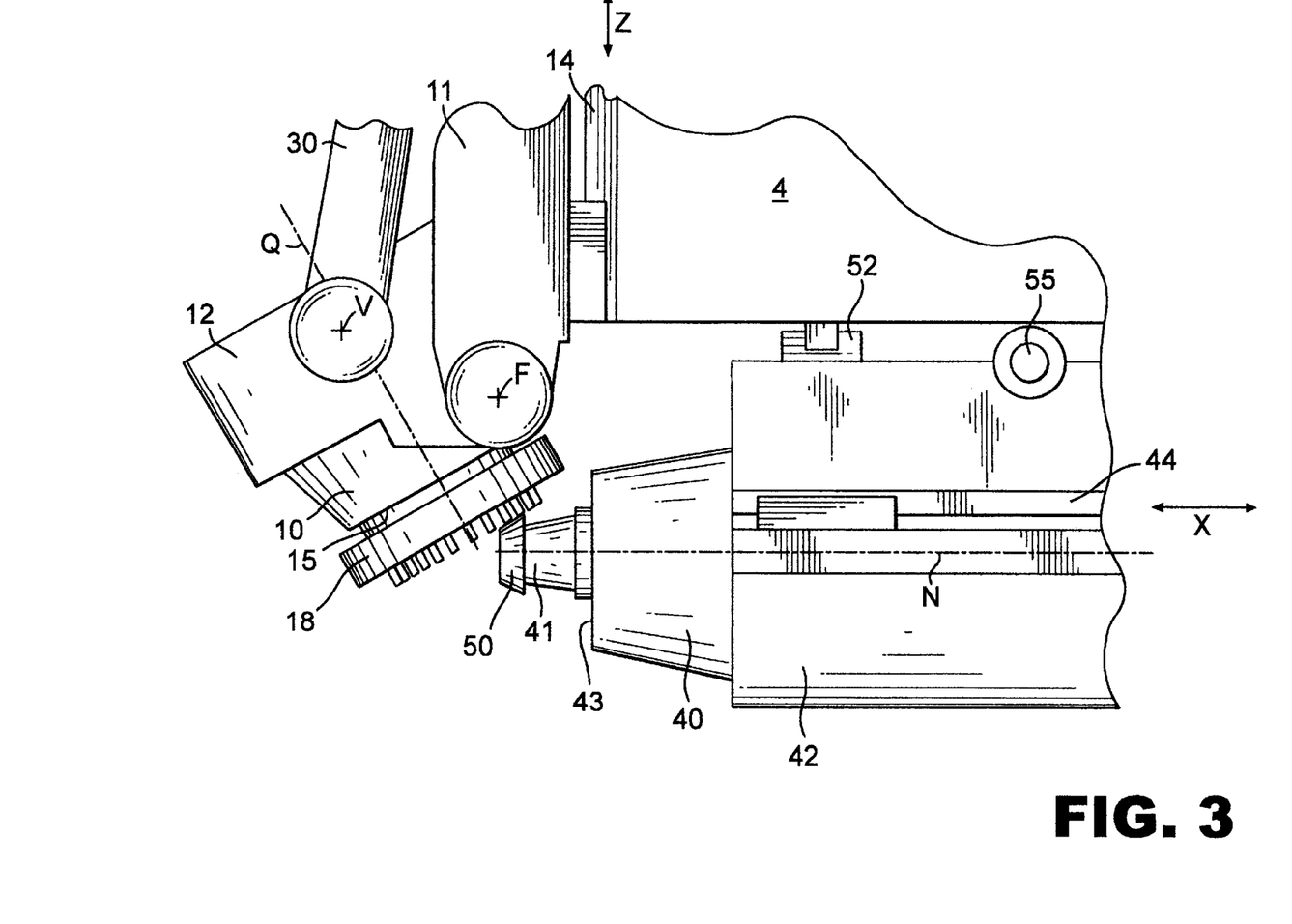
FIG. 3 is a top view of the gear manufacturing machine of FIG. 2.
Figure 4:
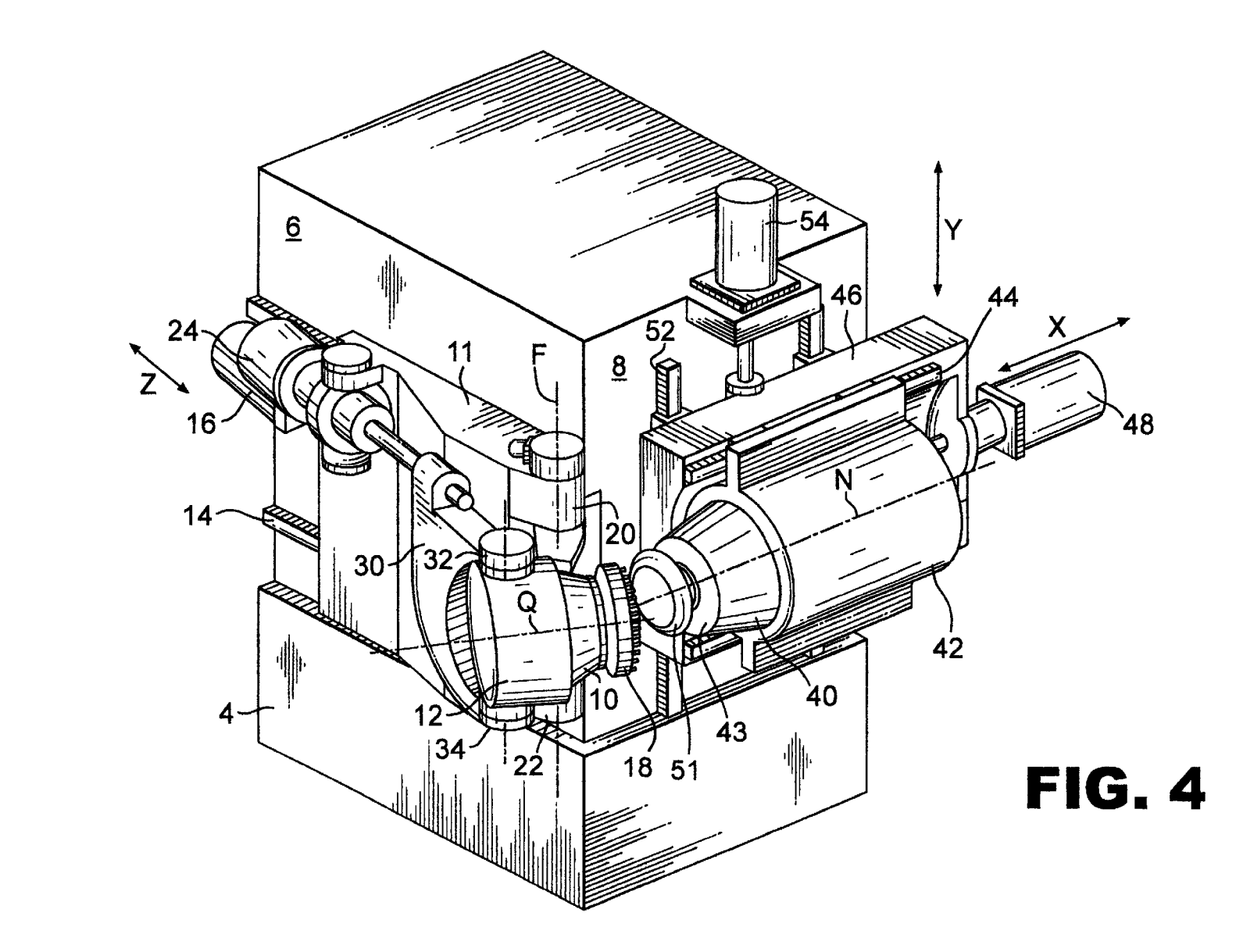
FIG. 4 is an isometric view of the first embodiment of the inventive gear manufacturing machine showing a cutting tool engaged with a ring gear.
Figure 5:
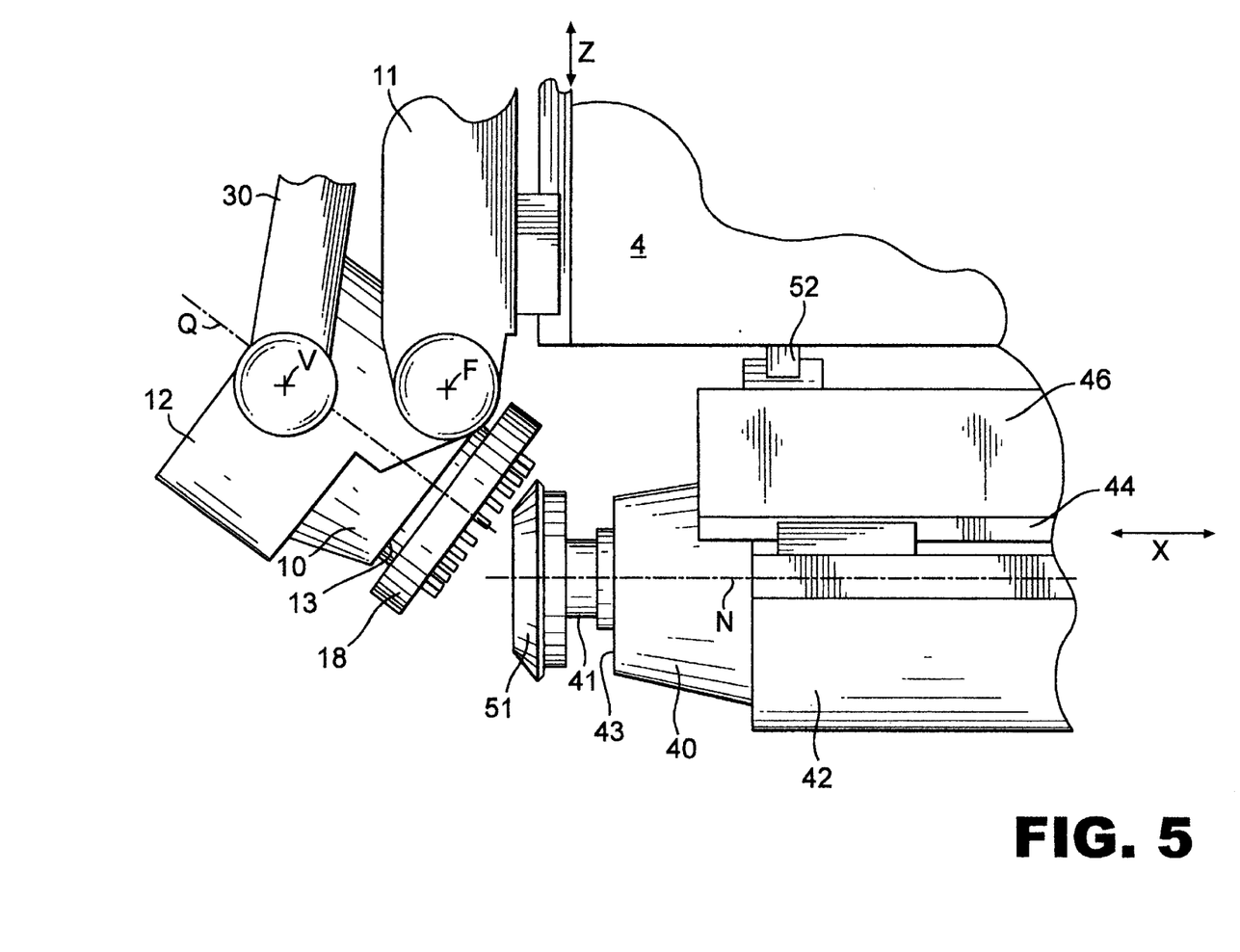
FIG. 5 is a top view of the gear manufacturing machine of FIG. 4.

As an example, a 12 tooth pinion having a pitch angle of 28.73° and a spiral angle of 50.0° is produced by generated face hobbing on a machine as shown in FIGS. 1–3. The basic settings for the machine were as follows:

| | | |
|---|---|---|
| s | = 135.82 | radial |
| q | = 65.83 | center of roll |
| i | = 31.79 | tilt angle |
| j | = 320.26 | swivel angle |
| $E_m$ | = 48.2638 | offset |
| $X_p$ | = −0.0091 | head setting |
| $X_b$ | = 34.6578 | slide base offset |
| gamma (γ) | = −0.01 | root angle |
| $M_d$ | = 116.84 | mounting distance |
| $A_b$ | = 139.7 | arbor height |
| h | = 101.6 | tool height |
| BN | = 17 | number of blade groups on the cutting tool |
| $R_a$ | = 3.58335 | ratio of roll |

The hobbing or index constant, $R_C$, is defined by the ratio of the number of blade groups on the cutting tool divided by the number of teeth on the workpiece. Therefore:

$R_C = BN/\text{no. teeth}_{workpiece} = 17/12$

Additional machine constants (see FIG. 12):

$\Delta X_C = 152.4$ mm $\Delta Z_C = -76.2$ mm

Figure 15:
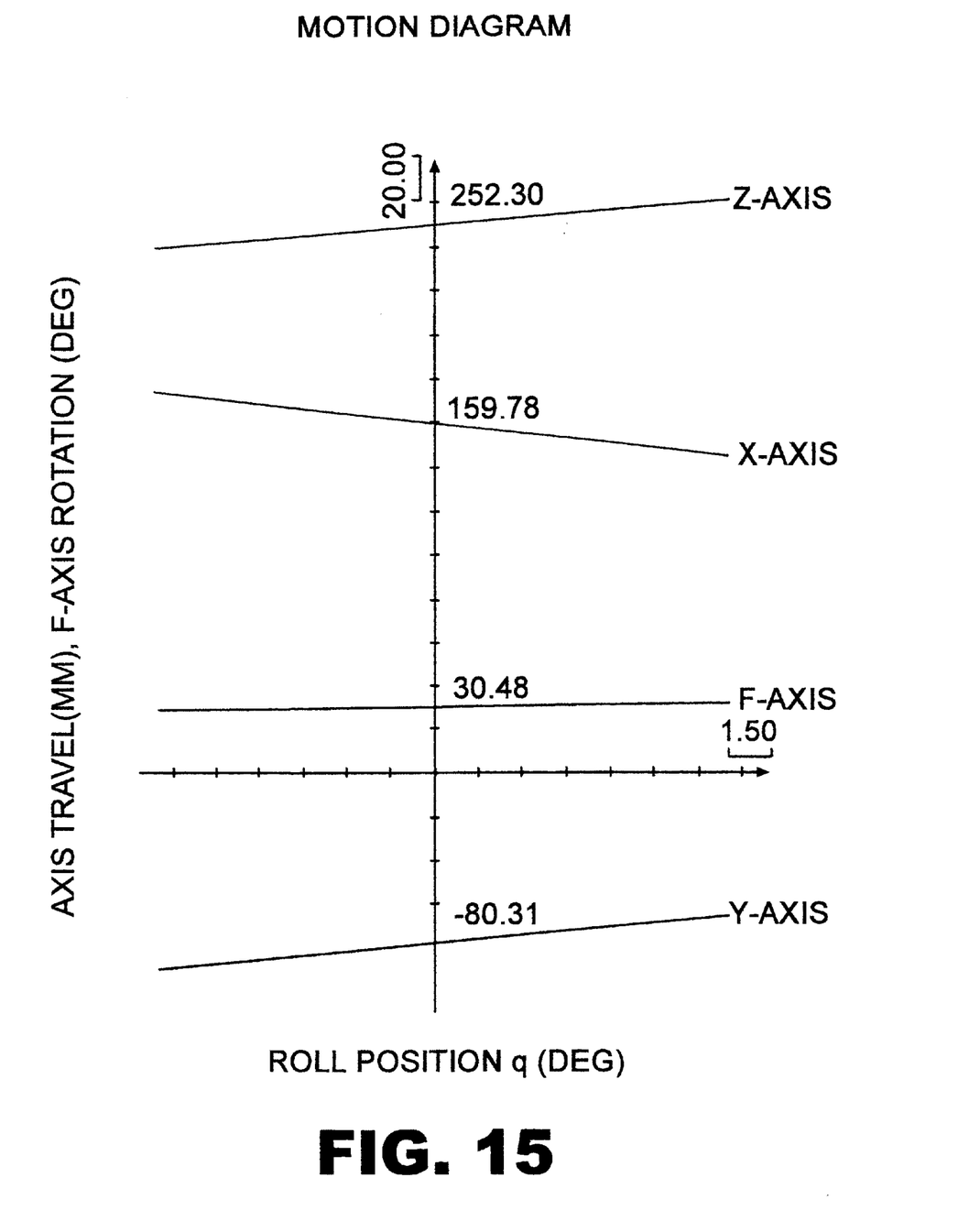
FIG. 15 is a machine axes motion diagram for a pinion cut on the machine embodiment shown in FIGS. 1–3.

Looking at the machine axes motion diagram of FIG. 15, it is shown that during the generation of the face hobbed pinion described above, there was about 20 mm of motion along each of the Z and Y axes and about 30 mm of motion along the X axis. It is also noted that rotation about the pivot axis F was about 0.5 degree. No points of inflection or reversal for any axes are noted on the diagram.

It is to be understood that although the present invention has been discussed and illustrated with respect to a cutting machine, the present invention is also understood to equally encompass a grinding machine for bevel gears.

While the invention has been described with reference to preferred embodiments it is to be understood that the invention is not limited to the particulars thereof. The present invention is intended to include modifications which would be apparent to those skilled in the art to which the subject matter pertains.

What is claimed is:

1. A machine for manufacturing bevel and hypoid gears comprising:
    a stationary column;
    a slide;
    vertical ways located between a first vertical surface area of said column and said slide to allow movement of said slide along a first linear direction;
    a workpiece spindle;
    first horizontal ways located between said slide and said workpiece spindle to allow movement of said workpiece spindle along said slide in a second linear direction;
    a tool spindle;
    second horizontal ways located between a second vertical surface area of said column and said tool spindle to allow movement of said tool spindle along a third linear direction; and
    a pivot connected to said tool spindle to allow movement of said tool spindle around a vertical pivot axis.

2. The machine of claim 1, wherein said tool spindle is configured to support a tool which rotates around a tool axis and said pivot includes a first bearing connection located a first vertical distance above said tool axis and a second bearing connection located a second vertical distance below said tool axis.

3. The machine of claim 1, wherein said tool spindle is configured to support a tool which rotates around a tool axis and said vertical pivot axis is located between said tool axis and said second vertical surface area of said column.

4. A machine for manufacturing bevel and hypoid gears comprising:
    a stationary column including a first side and a second side with said first side and said second side being perpendicular to one another;
    a workpiece spindle;
    means for movably supporting said workpiece spindle on said first side of said column for movement of said workpiece spindle along a vertical direction and a first horizontal direction;
    a tool spindle;
    means for movably supporting said tool spindle on said second side of said column for movement of said tool spindle along a second horizontal direction; and
    means for pivotably supporting said tool spindle for movement of said tool spindle around a vertical pivot axis.

5. The machine of claim 4, wherein the first horizontal direction is perpendicular to the second horizontal direction.

* * * * *